US011921383B2

(12) United States Patent
Kim et al.

(10) Patent No.: US 11,921,383 B2
(45) Date of Patent: Mar. 5, 2024

(54) LIQUID CRYSTAL DISPLAY DEVICE AND METHOD FOR OPERATING THE SAME

(71) Applicant: Electronics and Telecommunications Research Institute, Daejeon (KR)

(72) Inventors: Yong Hae Kim, Daejeon (KR); Chi-Sun Hwang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 18/084,203

(22) Filed: Dec. 19, 2022

(65) Prior Publication Data

US 2023/0280620 A1   Sep. 7, 2023

(30) Foreign Application Priority Data

Mar. 4, 2022   (KR) .................. 10-2022-0027909

(51) Int. Cl.
*G02F 1/1343*   (2006.01)
*G02F 1/1333*   (2006.01)
*G02F 1/1335*   (2006.01)

(52) U.S. Cl.
CPC .. *G02F 1/134345* (2021.01); *G02F 1/133357* (2021.01); *G02F 1/133514* (2013.01); *G02F 1/13439* (2013.01)

(58) Field of Classification Search
CPC ......... G02F 1/134345; G02F 1/133357; G02F 1/133514; G02F 1/13439

(Continued)

(56) References Cited

U.S. PATENT DOCUMENTS

| 11,069,751 B2 | 7/2021 | Kim et al. |
| 11,215,899 B2 | 1/2022 | Kim et al. |

(Continued)

FOREIGN PATENT DOCUMENTS

| KR | 10-2019-0077139 | 7/2019 |
| KR | 10-2020-0050517 | 5/2020 |

OTHER PUBLICATIONS

James A. Dolan et al., "Broadband Liquid Crystal Tunable Metasurfaces in the Visible: Liquid Crystal Inhomogeneities Across the Metasurface Parameter Space", ACS Photonics, Jan. 15, 2021, pp. 567-575, vol. 8.

(Continued)

*Primary Examiner* — Edward J Glick
*Assistant Examiner* — William D Peterson
(74) *Attorney, Agent, or Firm* — KILE PARK REED & HOUTTEMAN PLLC

(57) ABSTRACT

Provided is a liquid crystal display device and a method for operating the liquid crystal display device. In the liquid crystal display device including a plurality of pixels, one pixel of the plurality of pixels includes a first sub pixel and a second sub pixel, which are adjacent to each other. The one pixel includes a first substrate, a first electrode provided on the first substrate, metamaterial layers provided on the first electrode, wherein the metamaterial layers include a first metamaterial layer within the first sub pixel and a second metamaterial layer within the second sub pixel, a liquid crystal layer provided on the first and second metamaterial layers, a second electrode provided on the liquid crystal layer, and a second substrate provided on the second electrode. The first and second metamaterial layers include metamaterials having properties different from each other, respectively.

20 Claims, 13 Drawing Sheets

(58) Field of Classification Search
USPC .......................................................... 349/144
See application file for complete search history.

(56) References Cited

U.S. PATENT DOCUMENTS

| | | |
|---|---|---|
| 11,353,739 B2 | 6/2022 | Yoo et al. |
| 2017/0322457 A1 | 11/2017 | Chanda et al. |
| 2021/0325826 A1 | 10/2021 | Cheon et al. |
| 2022/0413347 A1* | 12/2022 | Li ...................... G02B 27/0093 |
| 2023/0101633 A1* | 3/2023 | Shi ...................... G02B 27/4227 |
| | | 359/630 |

OTHER PUBLICATIONS

Calum Williams et al., "Engineered pixels using active plasmonic holograms with liquid crystals", Phys. Status Solidi RRL, Jan. 12, 2015, pp. 125-129, vol. 9, No. 2.

* cited by examiner

LIQUID CRYSTAL DISPLAY DEVICE AND METHOD FOR OPERATING THE SAME

CROSS-REFERENCE TO RELATED APPLICATIONS

This U.S. non-provisional patent application claims priority under 35 U.S.C. § 119 of Korean Patent Application No. 10-2022-0027909, filed on Mar. 4, 2022, the entire contents of which are hereby incorporated by reference.

BACKGROUND

The present disclosure herein relates to a liquid crystal display device and a method for operating the same, and more particularly, to a liquid crystal display device including sub pixels using metamaterials in a plurality of pixels and a method for operating the liquid crystal display device.

Currently commercialized display devices include liquid crystal display devices, plasma display panels, organic light emitting displays, and the like, and their driving methods include a method for individually forming pixels emitting red light, green light, blue light, and/or white light to individually emit light or a method for implementing a color corresponding to the pixels by allowing the light emitted from a light source to pass through a color filter.

In the liquid crystal display devices, a liquid crystal may be a material in a mesophase between a crystal and a liquid. The term 'liquid crystal; is derived from characteristics of liquidity of the liquid and anisotropy of the crystal. The liquid crystal has order in position and direction in a crystal phase. However, the liquid crystals have disorder in position and direction in a liquid phase.

In the case of the individual emission type display device, color purity tends to be high, and an image quality is excellent. However, since elements having different materials and properties has to be formed for each pixel, process difficulty is high, and thus, it is difficult to implement large-sized display devices. On the other hand, in the case of the display device that passes the light source through a color filter, it tends to be easy for implementing a large area compared to the individual emission type display device, but since the color filter absorbs light, an energy loss of the emitted light is inevitable, and a half-width of the finally emitted light is wide to deteriorate luminance and color purity. In addition, in the case of the display device such as the liquid crystal display device in which the light source passes through the color filter, it is difficult to scale down due to physical limitations such as the light source device and the color filter in relation to resolution of the pixel. To solve these limitations the like, cases of applying metamaterials to the display device are increasing.

The metamaterial is a new word that combines a prefix meta-, which has the meaning of 'higher' or 'transcendence', and a material that represents a material. In a broad sense, the metamaterial that is designed and prepared to have artificial physical properties that do not exist in nature by designing an appropriate geometric periodic structure using existing materials. Unlike the early metamaterials, the design of the metamaterial with respect to light waves having a wavelength less than microwaves is being actively conducted as nanoprocessing technologies are developed. Particularly, as the fields of application of the metamaterials have recently expanded, various properties are required according to the fields of application, and the development of new materials that are capable of being applied to the metamaterials to solve their limitations is getting a lot of attention. To apply the metamaterials to the elements that require rapid and dynamic property changes, such as holography and optical integration elements, it is necessary to develop active metamaterials of which dielectric properties are changed freely according to external signals, and even in the display devices, applications and combinations of various metamaterials are being tested.

SUMMARY

The present disclosure provides a liquid crystal display device that increases in pixel resolution and is highly integrated by constituting a sub pixel to enable different types of light modulation, and a method for operating the liquid crystal display device.

Technical objects to be solved by the present invention are not limited to the aforementioned technical objects and unmentioned technical objects will be clearly understood by those skilled in the art from the specification and the appended claims.

An embodiment of the inventive concept provides a liquid crystal display device including a plurality of pixels, wherein one pixel of the plurality of pixels includes a first sub pixel and a second sub pixel, which are adjacent to each other, wherein the one pixel includes: a first substrate; a first electrode provided on the first substrate; metamaterial layers provided on the first electrode, wherein the metamaterial layers include a first metamaterial layer within the first sub pixel and a second metamaterial layer within the second sub pixel; a liquid crystal layer provided on the first and second metamaterial layers; a second electrode provided on the liquid crystal layer; and a second substrate provided on the second electrode, wherein the first and second metamaterial layers includes metamaterials having properties different from each other, respectively.

In an embodiment of the inventive concept, in a method for operating a liquid crystal display device including a plurality of pixels, wherein one pixel of the plurality of pixels includes a first sub pixel and a second sub pixel, which are disposed to be adjacent to each other, wherein the one pixel includes: a first substrate; a first electrode provided on the first substrate; metamaterial layers provided on the first electrode, wherein the metamaterial layers includes a first metamaterial layer within the first sub pixel and a second metamaterial layer within the second sub pixel; a liquid crystal layer provided on the first and second metamaterial layers; a second electrode provided on the liquid crystal layer; and a second substrate provided on the second electrode, wherein the first and second metamaterial layers include metamaterials having properties different from each other, respectively, wherein the operating method includes: applying no voltage to the first electrode; applying a first voltage to phase-modulate a first portion of the liquid crystal layer provided on the first metamaterial layer to a first value and phase-modulate a second portion of the liquid crystal layer provided on the second metamaterial layer to a second value; applying a second voltage to maintain the first portion of the liquid crystal layer to the first value and phase-modulate the second portion of the liquid crystal layer to the first value; applying a third voltage to phase-modulate the first portion of the liquid crystal layer to the second value and maintain the second portion of the liquid crystal layer to the first value; and applying a fourth voltage to maintain the first portion of the liquid crystal layer to the second value and phase-modulate the second portion of the liquid crystal layer to the second value.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

Figure 1:
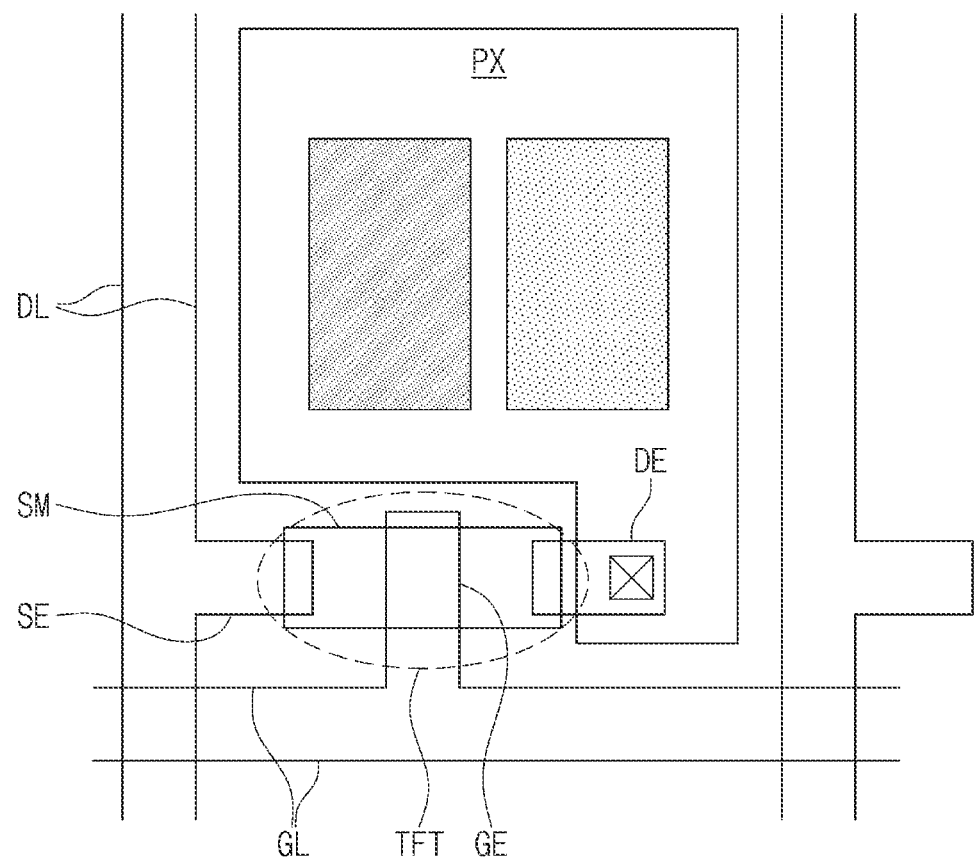
FIG. 1 is a plan view illustrating a pixel of a liquid crystal display device according to an embodiment of the inventive concept.

Embodiments of the inventive concept will be described with reference to the accompanying drawings so as to sufficiently understand constitutions and effects of the inventive concept.

The present invention is not limited to the embodiments disclosed below, but should be implemented in various forms, and various modifications and changes may be made. Rather, these embodiments are provided so that this disclosure will be thorough and complete, and will fully convey the scope of the present invention to those skilled in the art. Further, the present invention is only defined by scopes of claims. In the accompanying drawings, the components are shown enlarged for the sake of convenience of explanation, and the proportions of the components may be exaggerated or reduced for clarity of illustration.

In the following description, the technical terms are used only for explaining a specific exemplary embodiment while not limiting the present invention. Unless terms used in embodiments of the present invention are differently defined, the terms may be construed as meanings that are commonly known to a person skilled in the art.

In this specification, the terms of a singular form may comprise plural forms unless specifically mentioned. The meaning of 'comprises' and/or 'comprising' specifies a component, a step, an operation and/or an element does not exclude other components, steps, operations and/or elements.

When a layer is referred to herein as being 'on' another layer, it may be formed directly on the top of the other layer or a third layer may be interposed between them.

It will be understood that although the terms first and second are used herein to describe various regions, layers, and the like, these regions and layers should not be limited by these terms. These terms are used only to discriminate one region or layer from another region or layer. Therefore, a portion referred to as a first portion in one embodiment can be referred to as a second portion in another embodiment. An embodiment described and exemplified herein includes a complementary embodiment thereof. Like reference numerals refer to like elements throughout.

Hereinafter, a liquid crystal display device and a method for operating the liquid crystal display device according to embodiments of the inventive concept will be described in detail with reference to FIGS. 1 to 7.

FIG. 1 is a plan view illustrating a pixel of a liquid crystal display device according to an embodiment of the inventive concept.

Referring to FIG. 1, a liquid crystal display device may include a plurality of gate lines GL and a plurality of data lines DL. The data lines DL may cross the gate lines GL. The gate lines GL may extend to a non-display area and be connected to a gate driver. The data lines DL may extend to the non-display area and be connected to a data driver. A pixel PX may be disposed on a display part of the liquid crystal display device. A plurality of adjacent pixels PX may define one unit. For example, the plurality of adjacent pixels PX connected to the same gate line GL may define one unit. The adjacent pixels PX may be connected to data lines DL different from each other, respectively. For example, one pixel PX may be connected to an odd-numbered data line DL, and another pixel PX adjacent to the pixel PX may be connected to an even-numbered data line DL.

The pixels PX arranged along a horizontal line may be individually connected to the data lines DL, respectively. In addition, the pixels PX arranged along the horizontal line may be commonly connected to the gate line GL. Thus, the pixels PX arranged along the horizontal line may commonly receive a gate signal.

One pixel PX may include a thin film transistor TFT, a liquid crystal capacitance capacitor, and an auxiliary capacitance capacitor. Referring to FIG. 1, the thin film transistor TFT may include a gate electrode GE, a source electrode SE, a drain electrode DE, and a semiconductor SM. The thin film transistor TFT may be turned on according to the gate signal provided from the gate line GL. The thin film transistor TFT that is turned on may supply an analog image data signal provided from the data line DL to the liquid crystal capacitance capacitor and the auxiliary capacitance capacitor. The liquid crystal capacitance capacitor may include a pixel electrode and a common electrode, which are disposed opposite to each other.

Figure 2A:
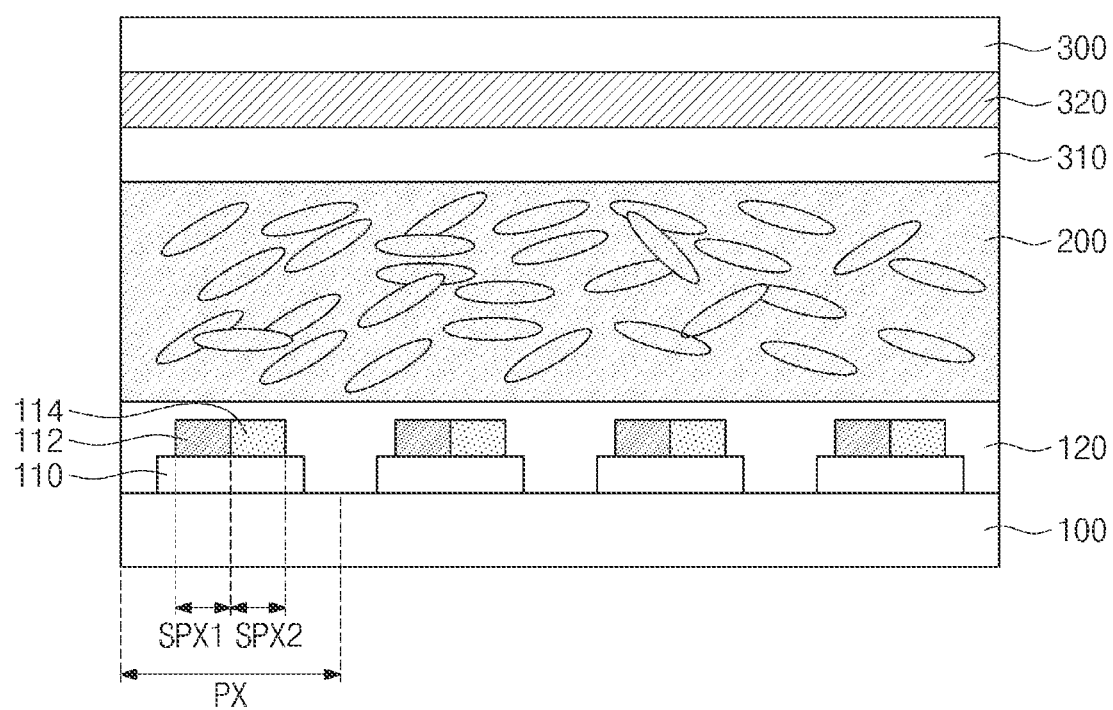
FIGS. 2A and 2B are cross-sectional views illustrating the liquid crystal display device according to an embodiment of the inventive concept.
Figure 2B:
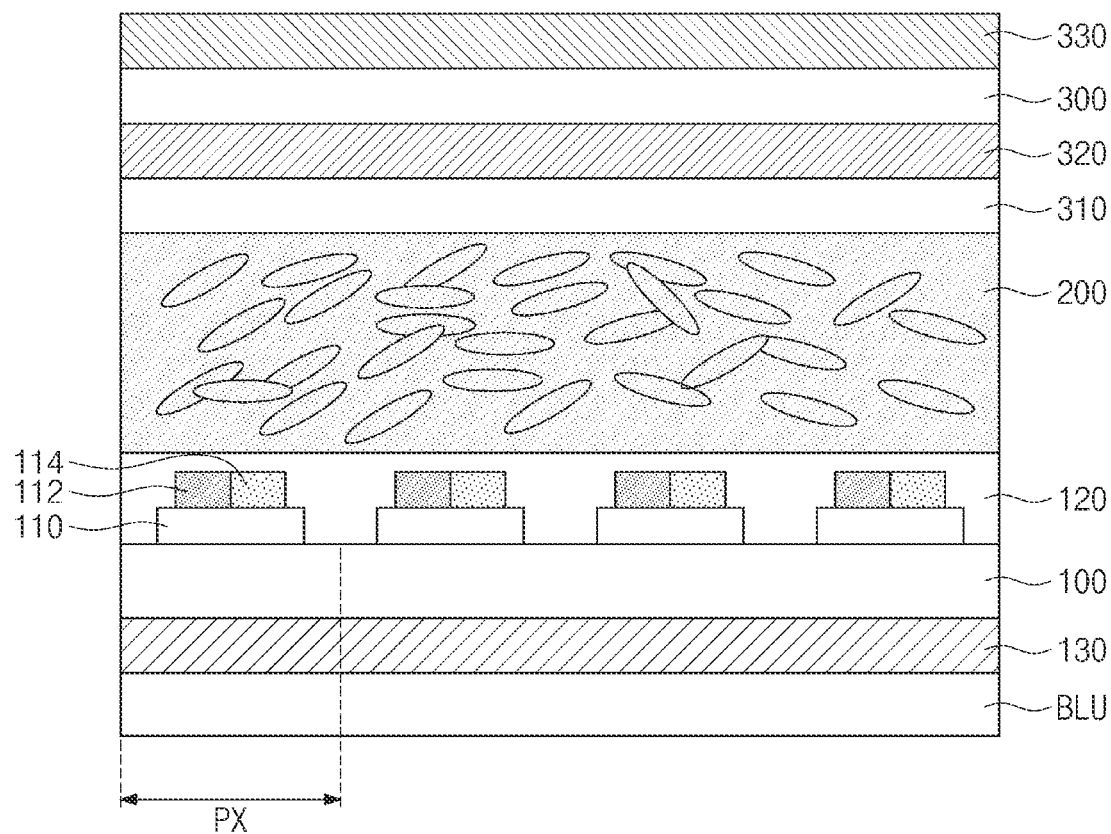

FIGS. 2A and 2B are cross-sectional views illustrating the liquid crystal display device according to an embodiment of the inventive concept. Although omitted in FIGS. 2A and 2B for convenience of explanation, the liquid crystal display device may include a gate line (GL in FIG. 1), a gate insulating film, a data line (DL in FIG. 1), a thin film transistor (TFT in FIG. 1), a protective film, and the like.

Referring to FIG. 2A, the liquid crystal display device may include a first substrate 100, a first electrode 110, metamaterial layers including a first metamaterial layer 112 and a second metamaterial layer 114, a planarization layer 120, a liquid crystal layer 200, a second electrode 310, a color filter layer 320, and a second substrate 300.

The first substrate 100 may include organic or inorganic materials. According to an embodiment, the first substrate 100 may be an insulating substrate such as soda lime glass or borosilicate glass. Alternatively, the first substrate 100 may be made of a flexible material. A plastic material may be used as the flexible material. For example, the first substrate 100 may be made of a material selected from the group consisting of kapton, polyethersulphone (PES), polycarbonate (PC), polyimide (PI), polyethyleneterephthalate (PET), polyethylenenaphthalate (PEN), polyacrylate (PAR), and fiber reinforced plastic (FRP). Also, the first substrate 100 may be transparent, translucent, or opaque.

The plurality of gate lines (GL in FIG. 1) may be disposed on the first substrate 100, and a gate insulating layer may be disposed on the gate lines (GL in FIG. 1). The data line (DL in FIG. 1) may be disposed in a direction crossing the gate line (GL in FIG. 1). The gate line (GL in FIG. 1) and the data line (DL in FIG. 1) may be connected to the thin film transistor (TFT in FIG. 1). In one embodiment, the protective layer may be disposed on the thin film transistor (TFT in FIG. 1), the data line (DL in FIG. 1), and the gate insulating layer. The protective layer may cover the thin film transistor (TFT in FIG. 1), the data line (DL in FIG. 1), and the gate insulating layer to prevent the thin film transistor, the data line, and the gate insulating layer from being separated and also insulate the thin film transistor, the data line, and the gate insulating layer from other conductive materials disposed on the protective layer.

The first substrate 100 may include a plurality of pixels PX in a plan view as illustrated in FIG. 2A. One pixel PX among the plurality of pixels PX may include a first sub pixel SPX1 and a second sub pixel SPX2, which are adjacent to each other. The one pixel PX may include a first substrate 100, a first electrode 110, metamaterial layers, a liquid crystal layer 200, a second electrode 310, and a second substrate 300. Here, the metamaterial layers may include a first metamaterial layer 112 within the first sub pixel and a second metamaterial layer 114 within the second sub pixel. According to another embodiment, the one pixel PX may include a plurality of sub pixels.

The first electrode 110 may be disposed on the first substrate 100. The first electrode 110 may be a pixel electrode. A plurality of first electrodes 110 may be disposed on the first substrate 100 so as to be spaced apart from each other. The first electrode 110 may have a planar or linear shape. The first electrode 110 may have a quadrangular shape. According to another embodiment, the planar shape of the first electrode 110 may be variously deformed such as a circular shape, an elliptical shape, or a hexagonal shape.

The first electrode 110 may be any one of a transmissive electrode, a transflective electrode, and a reflective electrode. To form the transmissive electrode, a transparent conductive oxide (TCO) may be used. As the transparent conductive oxide (TCO), there may be indium tin oxide (ITO), indium zinc oxide (IZO), zinc oxide (ZnO), or indium oxide ($In_2O_3$). Metals such as magnesium (Mg), silver (Ag), gold (Au), calcium (Ca), lithium (Li), chromium (Cr), aluminum (Al), and copper (Cu) or alloys thereof may be used to form the transflective electrode and the reflective electrode. Here, each of the transflective electrode and the reflective electrode may be determined as a thickness. Generally, the transflective electrode may have a thickness of about 200 nm or less, and the reflective electrode may have a thickness of about 300 nm or more. As the thickness of the transflective type electrode decreases, light transmittance increases, but resistance increases, and as the thickness increases, the light transmittance may decrease. In addition, the transflective and reflective electrodes may be provided in a multilayer structure including a metal layer made of a metal or a metal alloy and a transparent conductive oxide (TCO) layer stacked on the metal layer.

The metamaterial layers may be disposed on the first electrode 110. The metamaterial layers may include a first metamaterial layer 112 and a second metamaterial layer 114, and the first and second metamaterial layers 112 and 114 may be disposed adjacent to each other. The first metamaterial layer 112 may be provided in the first sub pixel SPX1 within one pixel PX, and the second metamaterial layer 114 may be provided in the second sub pixel SPX2 within one pixel PX. The first and second metamaterial layers 112 and 114 may have different properties. According to an embodiment, the first and second metamaterial layers 112 and 114 may be provided to be spaced apart from the liquid crystal layer 200 by the planarization layer 120. According to another embodiment, upper portions of the first and second metamaterial layers 112 and 114 and a lower portion of the liquid crystal layer 200 may be coupled to each other.

Each of the first and second metamaterial layers 112 and 114 may have a rectangular shape corresponding to the shape of the first electrode 110. In addition, each of the first and second metamaterial layers 112 and 114 may have a semicircular shape. According to another embodiment, the planar shape of each of the first and second metamaterial layers 112 and 114 may be variously deformed such as a circular shape, an elliptical shape, or a hexagonal shape.

Each of the first and second metamaterial layers 112 and 114 may include a nano-printed metasurface. A metasurface may mean a pattern of a two-dimensional metamaterial. The metasurface may have a two-dimensional pattern constituted by subwavelength-sized elements. The metamaterial of the metamaterial layers may be one of a material group that is artificially processed from a material existing in nature.

Each of the first and second metamaterial layers 112 and 114 may include a chalcogenide-based phase change material (GeSbTe), vanadium oxide (VOX), a grapheme capacitor, or a combination thereof. For example, a GST ($Ge_2Sb_2Te_5$) thin film may be used as the chalcogenide-based phase change material. The GST thin film is a material that is changed from an amorphous structure to a crystalline structure when being subjected to heat treatment between a glass temperature and a melting point temperature. Since an area on which the amorphous structure is formed and an area on which the crystalline structure is formed have different optical properties, light may be controlled using the areas. Vanadium oxide (VOX) is a material in which an electron concentration rapidly increases to about 1.9E23, and a dielectric constant is rapidly changed while undergoing a metal-insulator phase transition near about 68° C. Since vanadium oxide (VOX) exhibits hysteresis properties near its phase transition temperature, if the temperature of the substrate is maintained at a temperature of about 68° C., and heat is applied locally using a laser, only the area may undergo a phase transition to a metal. This may be used to control a change in behavior between the metamaterials and the liquid crystal. According to another embodiment, the first and second metamaterial layers 112 and 114 may be provided through a reversible electrodeposition technique. The reversible electrodeposition technique may be a technique capable of reversibly depositing or removing a metal such as Ag on the surface of a conductive electrode. The deposited Ag may have good metallic properties and may be optically characterized by metallic reflection.

The first and second metamaterial layers 112 and 114 may have different properties. For example, the first metamaterial layer 112 may include a chalcogenide-based phase change material, and the second metamaterial layer 114 may include a vanadium oxide (VOX) material. Thus, a temperature at which a crystal structure of the first metamaterial layer 112 is changed and a temperature at which the second metamaterial layer 114 undergoes the phase transition may be different from each other. When the temperature applied to the pixel PX is different, the first and second metamaterial layers 112 and 114 having different properties may affect the behavior of the liquid crystal layer 200.

The planarization layer 120 may be provided on the first electrode 110 and the metamaterial layers. The planarization layer 120 may space the first and second metamaterial layers 112 and 114 from the liquid crystal layer 200. The planarization layer 120 may include an insulating material. The planarization layer 120 may include a first layer made of an insulating material on a surface that is in direct contact with the first electrode 110 and a second layer including the first metamaterial layer 112 and the second metamaterial layer 114 on the first layer.

The liquid crystal layer 200 may be disposed on the pixel PX of the first substrate 100. The liquid crystal layer 200 may be provided between the first electrode 110 and the second electrode 310. More specifically, the liquid crystal layer 200 may be provided between the first and second metamaterial layers 112 and 114 on the first electrode 110 and the second electrode 310. A separate partition wall may not be provided in the liquid crystal layer 200. Thus, a width of the pixel PX may be reduced. The width of the pixel PX may have substantially the same value as a pitch of the pixel PX. Here, the plurality of first electrodes 110 may be provided on the first substrate 100, and the pitch of the pixel PX may mean a pitch between two adjacent first electrodes 110. The liquid crystal layer 200 may include liquid crystal molecules, and the liquid crystal molecules may be vertically aligned liquid crystal molecules having a negative permittivity. According to another embodiment, the liquid crystal molecules of the liquid crystal layer 200 may be horizontally aligned liquid crystal molecules.

The second electrode 310 may be disposed on the liquid crystal layer 200. The second electrode 310 may be disposed to overlap the first electrode 110. According to an embodiment, the second electrode 310 may have a planar shape and may be any one of a transmissive electrode, a transflective electrode, and a reflective electrode, which are described above with respect to the first electrode 110. The second electrode 310 may be a common electrode. The second electrode 310 may apply an electric field to the liquid crystal layer 200 together with the first electrode 110. Thus, an electric field may be generated in the liquid crystal layer 200 between the second electrode 310 and the first electrode 110.

The color filter layer 320 may be disposed on the second electrode 310. Light passing through the liquid crystal layer 200 may pass through the color filter layer 320. The color filter layer 320 may include a red filter, a green filter, a blue filter, or a combination thereof.

The second substrate 300 may be disposed on the color filter layer 320. The second substrate 300 may be disposed to face the first substrate 100. The second substrate 300 may be made of the same material as the first substrate 100 or a material different from that of the first substrate 100.

Referring to FIG. 2B, the liquid crystal display device may further include a backlight unit BLU, a first polarizer 130, and a second polarizer 330 in addition to the liquid crystal display device of FIG. 2A.

The backlight unit BLU may provide a light source to the liquid crystal display device. The backlight unit BLU may provide the light source toward the first polarizer 130. The light source may be white light in a visible light region. The backlight unit BLU may be one of a cold cathode fluorescent lamp, an external electrode fluorescent lamp, a light emitting diode (LED), and a flat fluorescent lamp.

The first polarizer 130 may be disposed on the backlight unit BLU. Alternatively, the first polarizer 130 may be disposed on the first substrate 100. The first polarizer 130 may allow vertically or horizontally polarized waves of the light source provided from the backlight unit BLU to distinguishably pass therethrough. That is, the first polarizer 130 may be a vertical polarizer or a horizontal polarizer. The light source passing through the first polarizer 130 may be a light source that vibrates in only one direction.

The second polarizer 330 may be disposed on the second substrate 300. The second polarizer 130 may allow the vertically or horizontally polarized waves of the light source to distinguishably pass therethrough. Here, each of the first polarizer 130 and the second polarizer 330 may have an angle of about 90 degrees in a direction of a blocking layer that blocks the light source. That is, when the first polarizer 130 is the vertical polarizer, the second polarizer 330 may be the horizontal polarizer, and when the first polarizer 130 is the horizontal polarizer, the second polarizer 330 may be the vertical polarizer.

Figure 3:
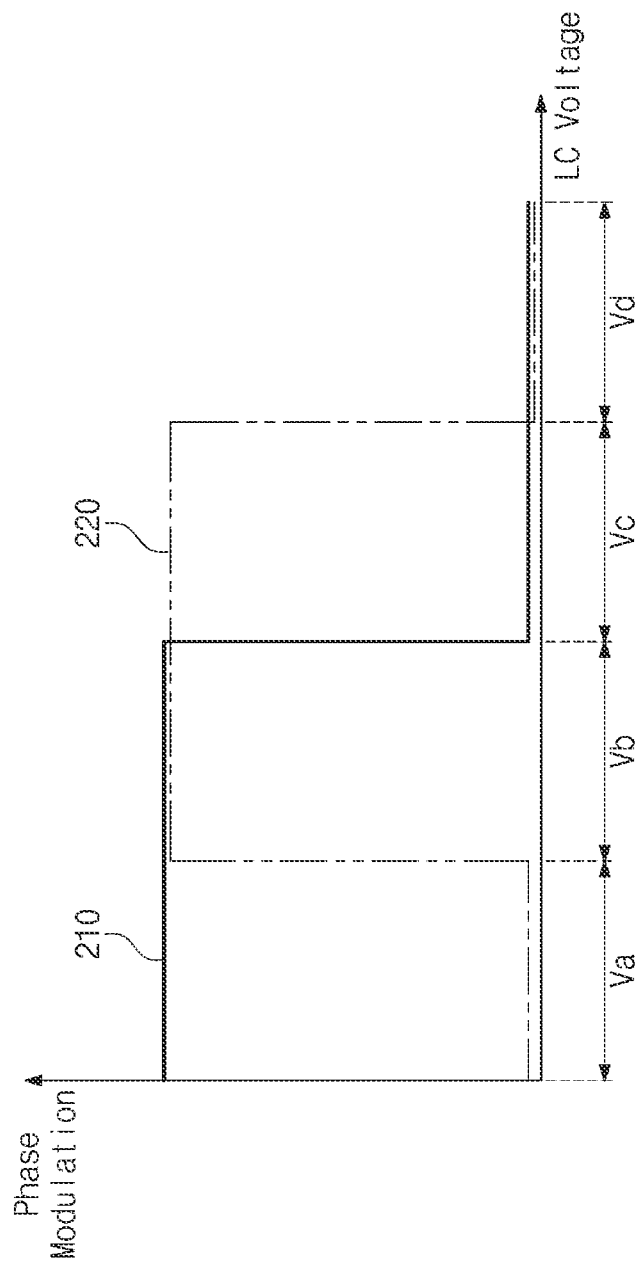
FIG. 3 is a view illustrating a relationship between an applied voltage and phase modulation of a liquid crystal of the liquid crystal display device according to an embodiment of the inventive concept.

FIG. 3 is a view illustrating a relationship between an applied voltage and phase modulation of a liquid crystal of the liquid crystal display device according to an embodiment of the inventive concept. FIGS. 4A to 4D are cross-sectional views illustrating a process in which the liquid crystal is behaved in the pixel of the liquid crystal display device according to an embodiment of the inventive concept.

Figure 4A:
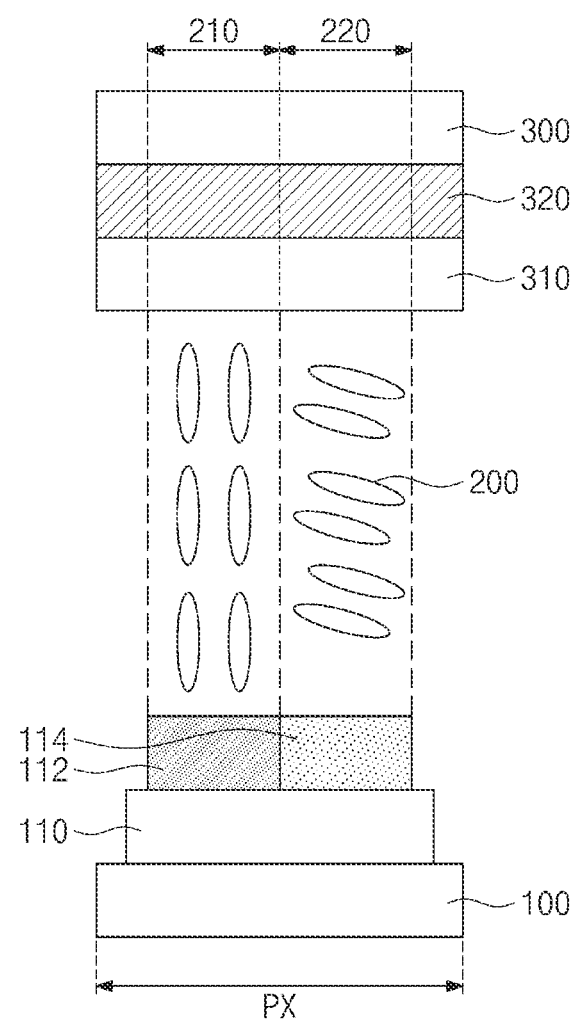
FIGS. 4A to 4D are cross-sectional views illustrating a process in which a liquid crystal is behaved in the pixel of the liquid crystal display device according to an embodiment of the inventive concept.
Figure 4B:
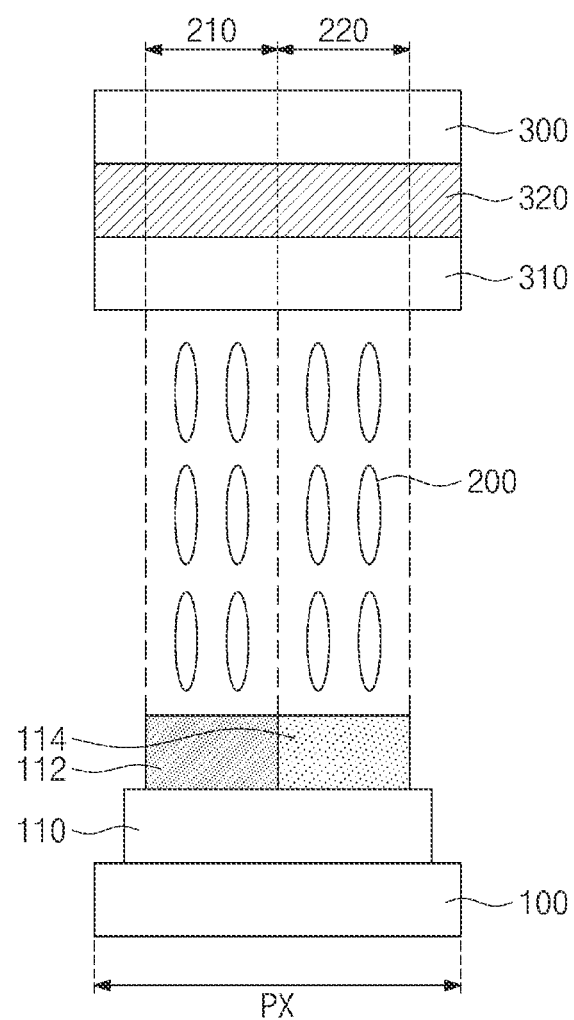

Referring to FIGS. 3 and 4A, when a first voltage Va is applied to the first electrode 100 of the pixel PX of the liquid crystal display device, the behavior of the liquid crystal layer 200 may be seen. The liquid crystal layer 200 may include a first portion 210 of the liquid crystal layer disposed on the first metamaterial layer 112 and a second portion 220 of the liquid crystal layer disposed on the second metamaterial layer 114. When the first voltage Va is applied to the first electrode 100, the behavior of each of the first portion 210 and the second portion 220 of the liquid crystal layer, which correspond to the metamaterial layers 112 and 114 including the metamaterials having different properties may vary. That is, even when the same first voltage Va is applied, a degree of the vertical alignment of the liquid crystal molecules of the first and second portions 210 and 220 of the liquid crystal layer may vary. In this case, a value at which the liquid crystal molecules are aligned closer to the vertical direction is referred to as a first value (high value), and a value at which the liquid crystal molecules are aligned closer to the horizontal direction is referred to as a second value (low value). According to the applied first voltage Va, a phase of the first portion 210 of the liquid crystal layer may be modulated to the first value, and a phase of the second portion 220 of the liquid crystal layer may be modulated to the second value. Therefore, light (light source) transmitted through the first portion 210 of the liquid crystal layer may be blocked by the second polarizer (reference numeral 330 in FIG. 2B), and light (light source) transmitted through the second portion 220 of the liquid crystal layer may pass through the color filter layer (reference numeral 320 in FIG. 2B) and the second polarizer (reference numeral 330 in FIG. 2B) to display a corresponding color on the display part of the liquid crystal display device.

Referring to FIGS. 3 and 4A, when a second voltage Vb is applied to the first electrode 100 of the pixel PX of the liquid crystal display device, the behavior of the liquid crystal layer 200 may be seen. When the second voltage Vb is applied to the first electrode 100, the behavior of each of the first portion 210 and the second portion 220 of the liquid crystal layer, which correspond to the metamaterial layers 112 and 114 including the metamaterials having different properties may vary. That is, even when the same second voltage Vb is applied, a degree of the vertical alignment of the liquid crystal molecules of the first and second portions 210 and 220 of the liquid crystal layer may vary. According to the applied second voltage Vb, a phase of the first portion 210 of the liquid crystal layer may be maintained to the first value, and a phase of the second portion 220 of the liquid crystal layer may be modulated to the second value. Therefore, light (light source) transmitted through the first portion 210 of the liquid crystal layer may be blocked by the second polarizer (reference numeral 330 in FIG. 2B), and light (light source) transmitted through the second portion 220 of the liquid crystal layer may also be blocked by the second polarizer (reference numeral 330 in FIG. 2B). In this case, all the light (light source) may be blocked, and the color displayed on the display part of the liquid crystal display device may be black.

Figure 4C:
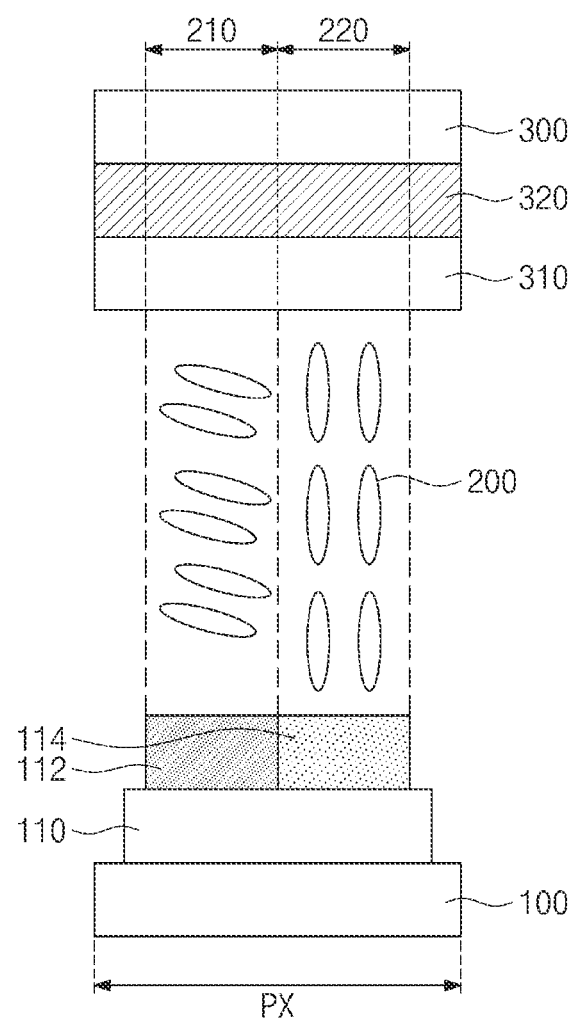

Referring to FIGS. 3 and 4C, when a third voltage Vc is applied to the first electrode 100 of the pixel PX of the liquid crystal display device, the behavior of the liquid crystal layer 200 may be seen. When the third voltage Vc is applied to the first electrode 100, the behavior of each of the first portion 210 and the second portion 220 of the liquid crystal layer, which correspond to the metamaterial layers 112 and 114 including the metamaterials having different properties may vary. That is, even when the same third voltage Vc is applied, a degree of the vertical alignment of the liquid crystal molecules of the first and second portions 210 and 220 of the liquid crystal layer may vary. According to the applied third voltage Vc, a phase of the first portion 210 of the liquid crystal layer may be modulated to the second value, and a phase of the second portion 220 of the liquid crystal layer may be maintained to the first value. Therefore, the light (light source) transmitted through the first portion 210 of the liquid crystal layer may pass through the color filter layer (reference numeral 320 in FIG. 2B) and the second polarizer (reference numeral 330 in FIG. 2B) to display a corresponding color on the display part of the liquid crystal display device, and the light (light source) transmitted through the second portion 220 of the liquid crystal layer may also be blocked by the second polarizer (reference numeral 330 in FIG. 2B).

Figure 4D:
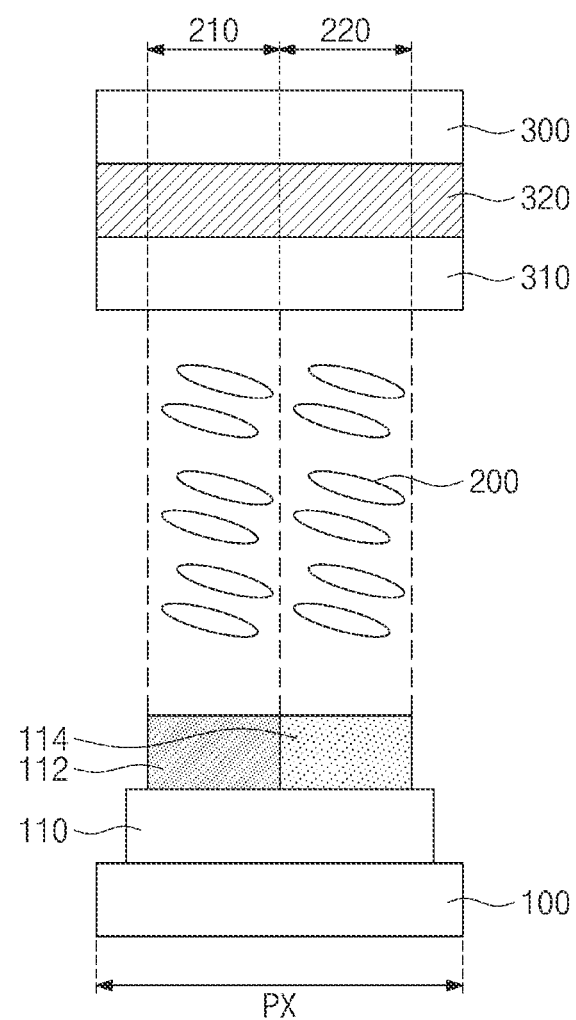

Referring to FIGS. 3 and 4d, when a fourth voltage Vd is applied to the first electrode 100 of the pixel PX of the liquid crystal display device, the behavior of the liquid crystal layer 200 may be seen. When the fourth voltage Vd is applied to the first electrode 100, the behavior of each of the first portion 210 and the second portion 220 of the liquid crystal layer, which correspond to the metamaterial layers 112 and 114 including the metamaterials having different properties may vary. That is, even when the same fourth voltage Vd is applied, a degree of the vertical alignment of the liquid crystal molecules of the first and second portions 210 and 220 of the liquid crystal layer may vary. According to the applied fourth voltage Vd, a phase of the first portion 210 of the liquid crystal layer may be maintained to the second value, and a phase of the second portion 220 of the liquid crystal layer may be modulated to the first value. Therefore, the light (light source) transmitted through the first portion 210 of the liquid crystal layer may pass through the color filter layer 320 to display a corresponding color on the display part of the liquid crystal display device, and the light (light source) transmitted through the second portion 220 of the liquid crystal layer may also pass through the color filter layer 320 to display a corresponding color on the display part of the liquid crystal display device.

Referring to FIGS. 3 to 4D, one pixel PX may include two sub pixels that correspond to the first and second portions 210 and 220 of the liquid crystal layer, respectively. Thus, one data may not be implemented by a single voltage as in the typical liquid crystal display device, but two or more data may be implemented by single voltage. As the data is implemented without increasing in number of driving signals (voltage, etc.), a driving speed may increase, or driving data may decrease. Also, since the pixel PX includes a plurality of sub pixels, effects of reducing the pitch of the pixel PX and improving the resolution may be obtained. In the case of an ultra-high resolution display device, resolution may be improved only at a high cost, but according to an embodiment of the inventive concept, the resolution may be improved even at a low cost, and thus, the inventive concept may be applied to the micro display field or 3D display field in the future.

FIGS. 5A to 5F are plan views illustrating an arrangement and combination of the metamaterial layer according to an embodiment of the inventive concept.

Figure 5A:
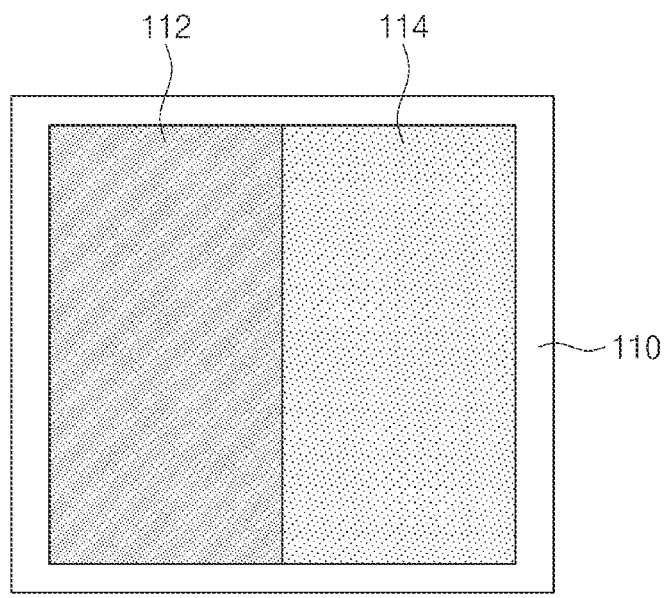
FIGS. 5A to 5F are plan views illustrating an arrangement and combination of a metamaterial layer according to an embodiment of the inventive concept.
Figure 5B:
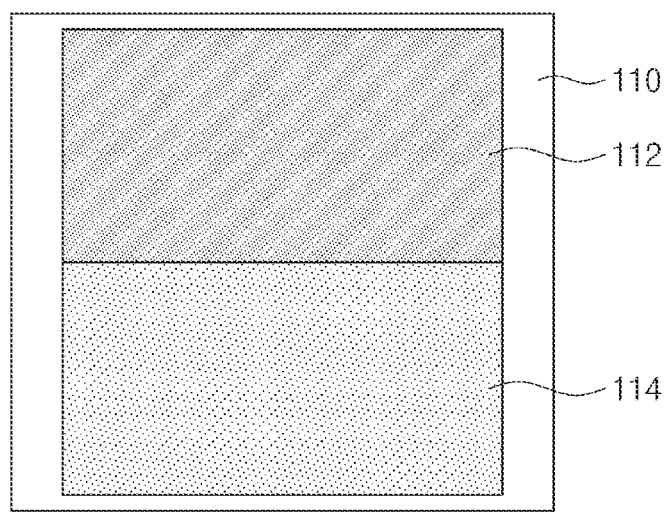
Figure 5C:
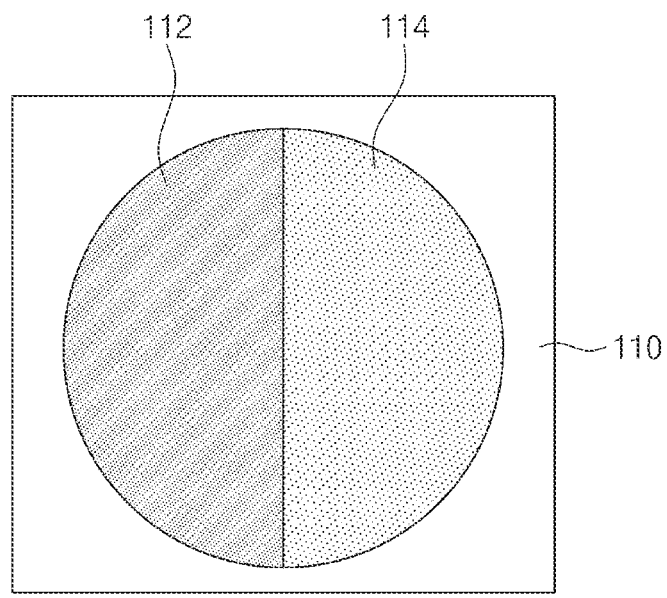
Figure 5D:
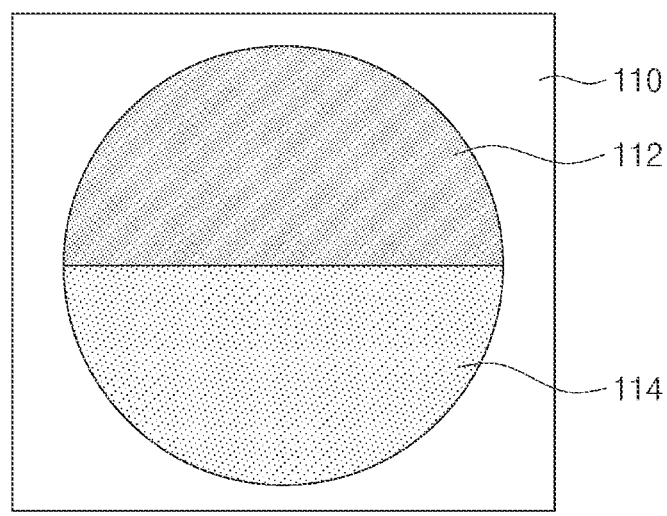

Referring to FIGS. 5A to 5D, various embodiments of arrangement of the metamaterial layers capable of implementing two or more data by the single voltage may be seen. In the case of FIGS. 5A and 5B, each of the first and second metamaterial layers 112 and 114 may have a rectangular shape corresponding to the shape of the first electrode 110. The first and second metamaterial layers 112 and 114 may be disposed to be adjacent to each other and may be disposed in a horizontal or vertical direction on a plane. In the case of FIGS. 5C and 5D, each of the first and second metamaterial layers 112 and 114 may have a semicircular shape. The first and second metamaterial layers 112 and 114 may be disposed to be adjacent to each other and may be disposed in the horizontal or vertical direction on the plane. In this case, each of the first and second metamaterial layers 112 and 114 may have a circular shape on the plane.

Figure 5E:
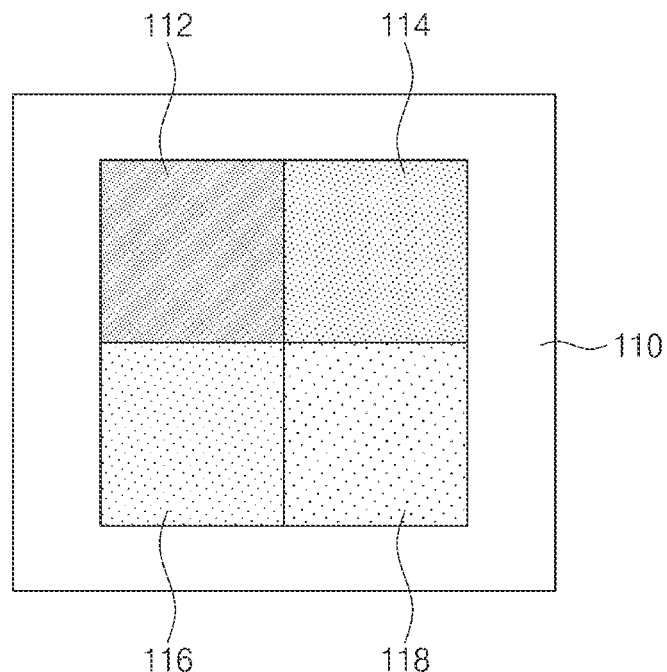
Figure 5F:
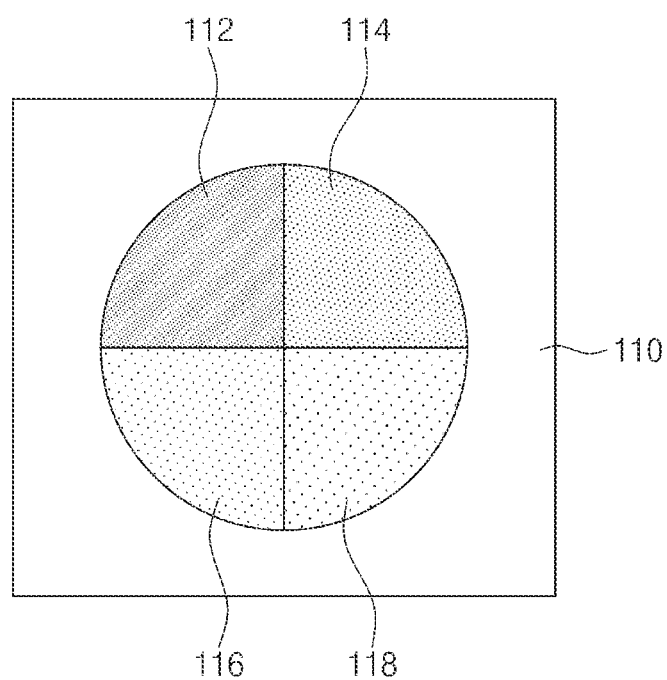

Referring to FIGS. 5E to 5F, various embodiments of arrangement of the metamaterial layers capable of implementing four or more data by the single voltage may be seen. In the case of FIG. 5E, each of the first to fourth metamaterial layers 112, 114, 116, and 118 may include a rectangular shape corresponding to the shape of the first electrode 110. The first to fourth metamaterial layers 112, 114, 116 and 118 may be disposed to be adjacent to each other. In the case of FIG. 5F, each of the first to fourth metamaterial layers 112, 114, 116, and 118 may have a quadrant shape. The first to fourth metamaterial layers 112, 114, 116 and 118 may be disposed to be adjacent to each other. In this case, each of the first to fourth metamaterial layers 112, 114, 116 and 118 may have a circular shape on the plane.

Figure 6:
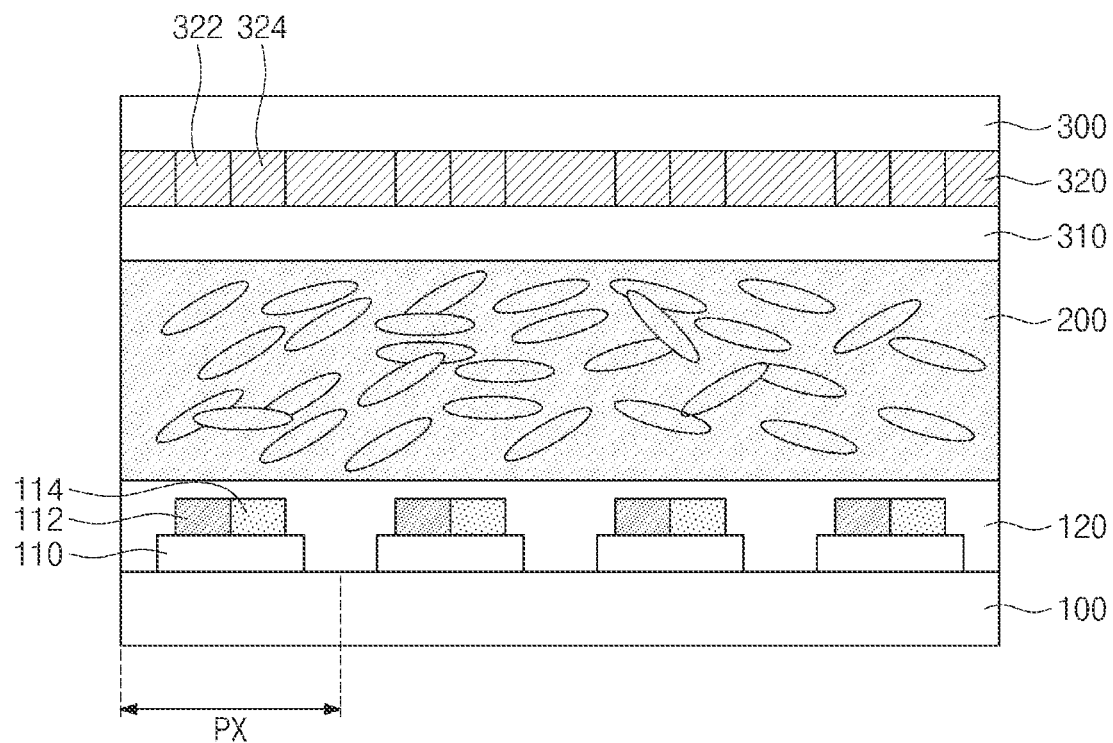
FIG. 6 is a cross-sectional view of the liquid crystal display device according to an embodiment of the inventive concept.

FIG. 6 is a cross-sectional view of the liquid crystal display device according to an embodiment of the inventive concept.

Referring to FIG. 6, the liquid crystal display device of FIG. 2 may further include a color filter layer 320 divided to correspond to a portion of the liquid crystal layer 200. The first color filter layer 322 may be provided on the first portion (reference numeral 210 in FIG. 4A) of the liquid crystal layer. The second color filter layer 324 may be provided on the second portion (reference numeral 220 in FIG. 4B) of the liquid crystal layer. The first and second color filter layers 322 and 324 may be provided on the second electrode 310. That is, the first color filter layer 322, the second electrode 310, and the first portion (reference numeral 210 in FIG. 4A) of the liquid crystal layer may vertically overlap each other. The second color filter layer 324, the second electrode 310, and the second portion (reference numeral 220 in FIG. 4A) of the liquid crystal layer may vertically overlap each other. Each of the first and second color filter layers 322 and 324 may include a red filter, a green filter, a blue filter, or a combination thereof. Thus, an effect of improving the resolution compared to the same number of pixels PX may be obtained.

Figure 7:
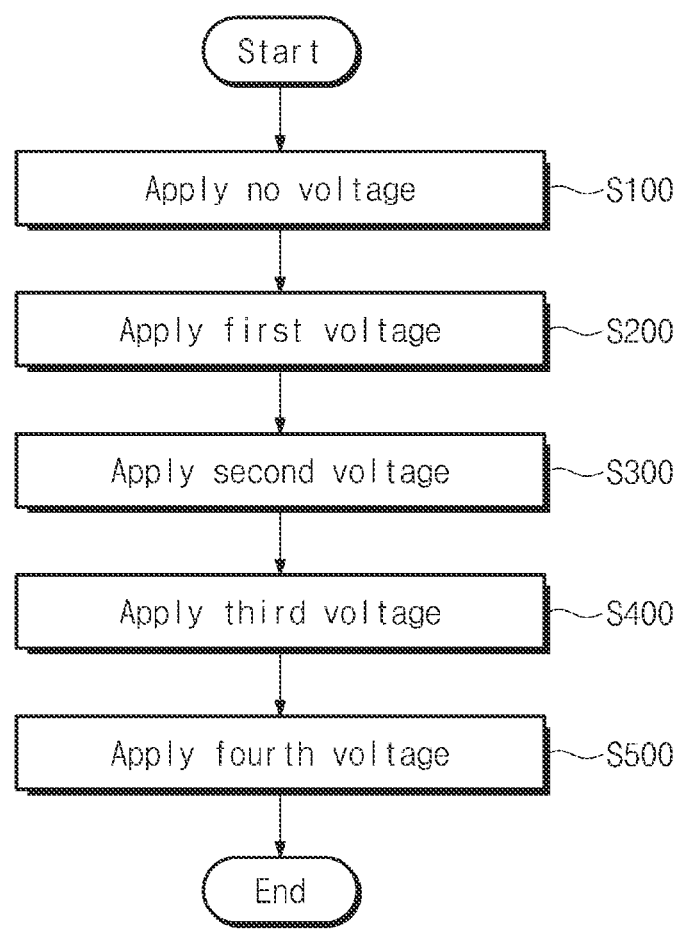
FIG. 7 is a flowchart illustrating a method for operating a liquid crystal display device according to an embodiment of the inventive concept.

FIG. 7 is a flowchart illustrating a method for operating a liquid crystal display device according to an embodiment of the inventive concept.

Referring to FIG. 7, a method for operating a liquid crystal display device includes a process (S100) in which a voltage is not applied, a process (S200) of applying a first voltage, a process (S300) of applying a second voltage, and a process (S400) of applying a third voltage, and a process (S500) of applying a fourth voltage.

The process (S100) in which the voltage is not applied may be a process in which the voltage is not applied to a first electrode of the liquid crystal display device. In this case, liquid crystal molecules of the liquid crystal layer (reference numeral 200 in FIG. 2) may be irregularly arranged.

The process (S200) of applying the first voltage may be a process of applying the first voltage (reference symbol Va in FIG. 3) to the first electrode. When the first voltage (reference symbol Va in FIG. 3) is applied, a degree of vertical alignment of the liquid crystal molecules in the first and second portions (reference numerals 210 and 220 in FIG. 4A) of the liquid crystal layer may vary. The first portion (reference numeral 210 of FIG. 4A) of the liquid crystal layer may be modulated in phase so that the liquid crystal molecules are vertically aligned according to the applied first voltage (reference symbol Va in FIG. 3), and the second portion (reference numeral 220 of FIG. 4A) of the liquid crystal layer may be modulated in phase so that the liquid crystal molecules are horizontally aligned according to the applied first voltage (reference symbol Va in FIG. 3). Therefore, light (light source) transmitted through the first portion (reference numeral 210 in FIG. 4A) of the liquid crystal layer may be blocked by the second polarizer (reference numeral 330 in FIG. 2B), and light (light source) transmitted through the second portion (reference numeral 220 in FIG. 4A) of the liquid crystal layer may pass through the color filter layer (reference numeral 320 in FIG. 2B) and the second polarizer (reference numeral 330 in FIG. 2B) to display a corresponding color on the display part of the liquid crystal display device.

The process (S300) of applying the second voltage may be a process of applying the second voltage (reference symbol Vb in FIG. 3) to the first electrode. When the second voltage (reference symbol Vb in FIG. 3) is applied, a degree of vertical alignment of the liquid crystal molecules in the first and second portions (reference numerals 210 and 220 in FIG. 4A) of the liquid crystal layer may vary. The first portion (reference numeral 210 of FIG. 4A) of the liquid crystal layer may be maintained in phase as in the process (S200) of applying the first voltage according to the applied second voltage (reference symbol Vb in FIG. 3), and the second portion (reference numeral 220 of FIG. 4A) of the liquid crystal layer may be modulated in phase so that the liquid crystal molecules are vertically aligned according to the applied second voltage (reference symbol Vb in FIG. 3). Therefore, light (light source) transmitted through the first portion (reference numeral 210 in FIG. 4A) of the liquid crystal layer may be blocked by the second polarizer (reference numeral 330 in FIG. 2B), and light (light source) transmitted through the second portion (reference numeral 220 in FIG. 4A) of the liquid crystal layer may also be blocked by the second polarizer (reference numeral 330 in FIG. 2B). In this case, all the light (light source) may be blocked, and the color displayed on the display part of the liquid crystal display device may be black.

The process (S400) of applying the third voltage may be a process of applying the third voltage (reference symbol Vc in FIG. 3) to the first electrode. When the third voltage (reference symbol Vc in FIG. 3) is applied, a degree of vertical alignment of the liquid crystal molecules in the first and second portions (reference numerals 210 and 220 in FIG. 4A) of the liquid crystal layer may vary. The first portion (reference numeral 210 of FIG. 4A) of the liquid crystal layer may be modulated in phase so that the liquid crystal molecules are horizontally aligned according to the applied third voltage (reference symbol Vc in FIG. 3), and the second portion of the liquid crystal layer (reference numeral 220 in FIG. 4A) of the liquid crystal layer may be maintained in phase as in the process (S300) of applying the second voltage. Therefore, the light (light source) transmitted through the first portion (reference numeral 210 of FIG. 4A) of the liquid crystal layer may pass through the color filter layer (reference numeral 320 in FIG. 2B) and the second polarizer (reference numeral 330 in FIG. 2B) to display a corresponding color on the display part of the liquid crystal display device, and the light (light source) transmitted through the second portion (reference numeral 220 of FIG. 4B) of the liquid crystal layer may also be blocked by the second polarizer (reference numeral 330 in FIG. 2B).

The process (S500) of applying the fourth voltage may be a process of applying the fourth voltage (reference symbol Vd in FIG. 3) to the first electrode. When the fourth voltage (reference symbol Vd in FIG. 3) is applied, a degree of vertical alignment of the liquid crystal molecules in the first and second portions (reference numerals 210 and 220 in FIG. 4A) of the liquid crystal layer may vary. The first portion (reference numeral 210 of FIG. 4A) of the liquid crystal layer may be maintained in phase as in the process (S400) of applying the third voltage according to the applied fourth voltage (reference symbol Vd in FIG. 3), and the second portion (reference numeral 220 of FIG. 4A) of the liquid crystal layer may be modulated in phase so that the liquid crystal molecules are vertically aligned according to the applied fourth voltage (reference symbol Vd in FIG. 3). Therefore, the light (light source) transmitted through the first portion (reference numeral 210 of FIG. 4A) of the liquid crystal layer may pass through the color filter layer 320 to display a corresponding color on the display part of the liquid crystal display device, and the light (light source) transmitted through the second portion (reference numeral 220 of FIG. 4B) of the liquid crystal layer may also pass through the color filter layer 320 to display a corresponding color on the display part of the liquid crystal display device. According to the method for operating the liquid crystal display device, two or more data may be implemented by a single voltage within one pixel PX.

According to the inventive concept, the liquid crystal display device, in which the two or more pieces of data are implemented in the one pixel, the pixel pitch decreases, and the resolution increases, may be provided. According to the inventive concept, the method for operating the liquid crystal display device, in which the two or more pieces of data are implemented in the one pixel, the pixel pitch decreases, and the resolution increases may be provided. Since the two or more pieces of data are implemented in the one pixel without increasing in number of driving signals, the driving speed may increase. Also, the amount of driving data for the operation of the liquid crystal display device may be reduced as a whole. In addition, according to the inventive concept, the sub pixel containing the metamaterials having the properties different from each other may be implemented to improve the resolution at the low cost. Therefore, the inventive concept may be applied to the reproduction area of the micro display, the 3D display, and the 3D hologram.

Although the embodiment of the inventive concept is described with reference to the accompanying drawings, those with ordinary skill in the technical field of the inventive concept pertains will be understood that the present disclosure can be carried out in other specific forms without changing the technical idea or essential features. Therefore, the above-disclosed embodiments are to be considered illustrative and not restrictive.

What is claimed is:

1. A liquid crystal display device comprising a plurality of pixels,
   wherein one pixel of the plurality of pixels comprises a first sub pixel and a second sub pixel, which are adjacent to each other,
   wherein the one pixel comprises:
      a first substrate;
      a first electrode on the first substrate;
      metamaterial layers on the first electrode, wherein the metamaterial layers comprise a first metamaterial layer within the first sub pixel and a second metamaterial layer within the second sub pixel;
      a liquid crystal layer on the first and second metamaterial layers;
      a second electrode on the liquid crystal layer; and
      a second substrate on the second electrode,
      wherein the first metamaterial layer and the second metamaterial layer comprise metamaterials having properties different from each other, respectively, and
      wherein, under a first voltage applied to the first electrode,
         the first metamaterial layer is configured to phase-modus a first port on of the liquid crystal layer to a first value.

2. The liquid crystal display device of claim 1, further comprising a planarization layer between each of the metamaterial layers and the liquid crystal layer.

3. The liquid crystal display device of claim 1, further comprising a planarization layer between the first substrate and the liquid crystal layer,
   wherein an upper portion of each of the metamaterial layers and a lower portion of the liquid crystal layer are coupled to each other.

4. The liquid crystal display device of claim 1, wherein each of the metamaterial layers has a rectangular shape corresponding to a shape of the first electrode.

5. The liquid crystal display device of claim 1, wherein each of the first and second metamaterial layers has a semicircular shape.

6. The liquid crystal display device of claim 1, wherein each of the metamaterial layers comprises a nano-printed metasurface.

7. The liquid crystal display device of claim 1, further comprising a color filter layer between the second substrate and the second electrode.

8. The liquid crystal display device of claim 7, wherein the color filter layer comprises color filters configured to display different colors to correspond to the first and second sub pixels.

9. The liquid crystal display device of claim 1, wherein, under a first voltage applied to the first electrode, the second metamaterial layer is configured to phase-modulate a second portion of the liquid crystal layer to a second value.

10. The liquid crystal display device of claim 9, wherein, under a second voltage applied to the first electrode, the second metamaterial layer is configured to phase-modulate the second portion of the liquid crystal layer to the first value.

11. The liquid crystal display device of claim 10, wherein, under a third voltage applied to the first electrode, the first metamaterial layer is configured to phase-modulate the first portion of the liquid crystal layer to the second value.

12. The liquid crystal display device of claim 11, wherein, under a fourth voltage applied to the first electrode, the second metamaterial layer is configured to phase-modulate the second portion of the liquid crystal layer to the second value.

13. The liquid crystal display device of claim 1, wherein each of the first and second metamaterial layers comprises a chalcogenide-based phase change material (GeSbTe), vanadium oxide (VOX), or a combination thereof.

14. A method for operating a liquid crystal display device comprising a plurality of pixels,
   wherein one pixel of the plurality of pixels comprises a first sub pixel and a second sub pixel, which are adjacent to each other,
   wherein the one pixel comprises:
      a first substrate;
      a first electrode on the first substrate;
      metamaterial layers on the first electrode, wherein the metamaterial layers comprise a first metamaterial layer within the first sub pixel and a second metamaterial layer within the second sub pixel;
      a liquid crystal layer on the first and second metamaterial layers;
      a second electrode on the liquid crystal layer; and
      a second substrate on the second electrode,
      wherein the first metamaterial layer and the second metamaterial layer comprise metamaterials having properties different from each other, respectively,
   wherein the method for operating comprises:
      applying no voltage to the first electrode;
      applying a first voltage to phase-modulate a first portion of the liquid crystal layer provided on the first metamaterial layer to a first value and phase-modulate a second portion of the liquid crystal layer provided on the second metamaterial layer to a second value;
      applying a second voltage to maintain the first portion of the liquid crystal layer to the first value and phase-modulate the second portion of the liquid crystal layer to the first value;
      applying a third voltage to phase-modulate the first portion of the liquid crystal layer to the second value and maintain the second portion of the liquid crystal layer to the first value; and
      applying a fourth voltage to maintain the first portion of the liquid crystal layer to the second value and phase-modulate the second portion of the liquid crystal layer to the second value.

15. The method of claim 14, wherein each of the metamaterial layers has a rectangular shape corresponding to a shape of the first electrode.

16. The method of claim 14, wherein each of the first and second metamaterial layers has a semicircular shape.

17. The method of claim 14, wherein each of the metamaterial layers comprises a nano-printed metasurface.

18. The method of claim 14, further comprising a color filter layer between the second substrate and the second electrode.

19. The method of claim 18, wherein the color filter layer comprises color filters configured to display different colors to correspond to the first and second sub pixels.

20. The method of claim 14, wherein each of the first and second metamaterial layers comprises a chalcogenide-based phase change material (GeSbTe), vanadium oxide (VOX), a graphene capacitor, or a combination thereof.

* * * * *